(12) United States Patent
Yamada et al.

(10) Patent No.: US 8,345,190 B2
(45) Date of Patent: Jan. 1, 2013

(54) POLARIZATION OPTICAL SYSTEM AND PROJECTION-TYPE LIQUID-CRYSTAL DISPLAY DEVICE

(75) Inventors: Akihiro Yamada, Tokyo (JP); Akira Daijogo, Tokyo (JP); Kenji Samejima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1100 days.

(21) Appl. No.: 12/179,818

(22) Filed: Jul. 25, 2008

(65) Prior Publication Data

US 2009/0161032 A1 Jun. 25, 2009

(30) Foreign Application Priority Data

Dec. 20, 2007 (JP) .................................. 2007-328676

(51) Int. Cl.
*G02F 1/1335* (2006.01)

(52) U.S. Cl. ............................................. 349/96; 349/5

(58) Field of Classification Search ......................... None
See application file for complete search history.

(56) References Cited

U.S. PATENT DOCUMENTS

| 5,600,456 A * | 2/1997 | Maruyama et al. ............. 349/64 |
| 6,556,266 B1 | 4/2003 | Shirochi et al. |
| 2002/0071069 A1 * | 6/2002 | Nakagawa et al. ............. 349/86 |
| 2002/0126228 A1 | 9/2002 | Yajima et al. |
| 2004/0001173 A1 * | 1/2004 | Yamauchi ...................... 349/113 |
| 2006/0197915 A1 * | 9/2006 | Kobayashi ....................... 353/31 |
| 2007/0258029 A1 | 11/2007 | Nakagawa et al. |

FOREIGN PATENT DOCUMENTS

| JP | 2001-42314 A | 2/2001 |
| JP | 2001-174776 A | 6/2001 |
| JP | 2002-072162 A | 3/2002 |
| JP | 2004-188836 A | 7/2004 |
| JP | 2006-171328 A | 6/2006 |
| JP | 2007-264008 A | 10/2007 |

OTHER PUBLICATIONS

Japanese Office Action for corresponding Application No. JP 2007-328676 dated Jun. 12, 2012 and partial English-language translation thereof.

* cited by examiner

*Primary Examiner* — Lucy Chien
(74) *Attorney, Agent, or Firm* — Birch, Stewart, Kolasch & Birch, LLP

(57) ABSTRACT

A polarization optical system includes a first polarization plate, arranged at the light incident side of a liquid-crystal light valve, for transmitting first polarized light (s-polarized light) included in light incident on the liquid-crystal light valve from an illumination optical system and a second polarization plate, arranged at the light exit side of the liquid-crystal light valve, for transmitting second polarized light (p-polarized light), different from the first polarized light (s-polarized light), included in imaging light emitted from the liquid-crystal light valve to a projection optical system, in which the second polarization plate is configured in such a way that its light-incident face is concave toward the liquid-crystal light valve.

11 Claims, 8 Drawing Sheets

(a)           (b)

POLARIZATION OPTICAL SYSTEM AND PROJECTION-TYPE LIQUID-CRYSTAL DISPLAY DEVICE

BACKGROUND OF THE INVENTION

1. Field of the Invention

The present invention relates to polarization optical systems and projection-type liquid-crystal display devices using the systems.

2. Description of the Related Art

In a conventional projection-type liquid-crystal display device, by reducing, when light is shielded, light transmittance for light flux incident on the center of a liquid-crystal light valve, contrast improvement has been achieved. However, when the light in the periphery of the liquid-crystal light valve is utilized, the light shielding efficiency is deteriorated; consequently, a problem has been that the contrast of the system is decreased.

Accordingly, a liquid-crystal display device has been proposed in Japanese Laid-Open Patent Publication No. 2001-42314 (refer to paragraph 0022, FIG. 5, and FIG. 28), which is provided with a polarization optical system including a first polarization plate, arranged at the incident side of a liquid-crystal light valve, for transmitting first linearly-polarized light, and a second polarization plate, arranged at the light exit side of the liquid-crystal light valve, for transmitting second linearly-polarized light whose polarizing axis is different from that of the first linearly-polarized light, so that the liquid-crystal-light-valve peripheral-light shielding efficiency can be improved. Moreover, in the above patent document, a configuration has been also proposed, in which a phase difference film, rotated to tilt at a predetermined angle around the polarization axis of the first or the second polarization plate as the axis of rotation, is further arranged, and the angular difference between the polarizing axis of the second polarization plate and a pretilt angle of a liquid-crystal molecule used for the liquid-crystal light valve is compensated, so that transmitted light not having been modulated by the liquid-crystal light valve is effectively absorbed by the second polarization plate.

However, light flux having an angular distribution around its optical axis is emitted from the liquid-crystal light valve. Therefore, even though the plane polarization plate and the phase difference film arranged with a tilt angle is used as described above, a part of the light flux incident at a predetermined angle, out of emitted light beams not having been modulated by the liquid-crystal light valve, is not completely absorbed by the polarization plate arranged at the light exit side of the liquid-crystal light valve; consequently, a problem has been that the contrast of the system is decreased.

SUMMARY OF THE INVENTION

An objective of the present invention, which is made to solve the above problems, is to provide a projection-type liquid-crystal display device, using a liquid-crystal light valve, by which emitted light not having been modulated by the liquid-crystal light valve can be effectively absorbed, and accordingly, relatively high contrast can be obtained.

A polarization optical system according to the present invention includes a first polarization plate, arranged at the light-incident side of a liquid-crystal light valve, for transmitting first linearly-polarized light included in light incident on the liquid-crystal light valve from an illumination optical system, and a second polarization plate, arranged at the light exit side of the liquid-crystal light valve, for transmitting second linearly-polarized light, different from the first linearly-polarized light, included in imaging light emitted from the liquid-crystal light valve to a projection optical system, in which the second polarization plate has a face concave toward the liquid-crystal light valve.

DETAILED DESCRIPTION OF THE PREFERRED EMBODIMENTS

Embodiment 1

Figure 1:
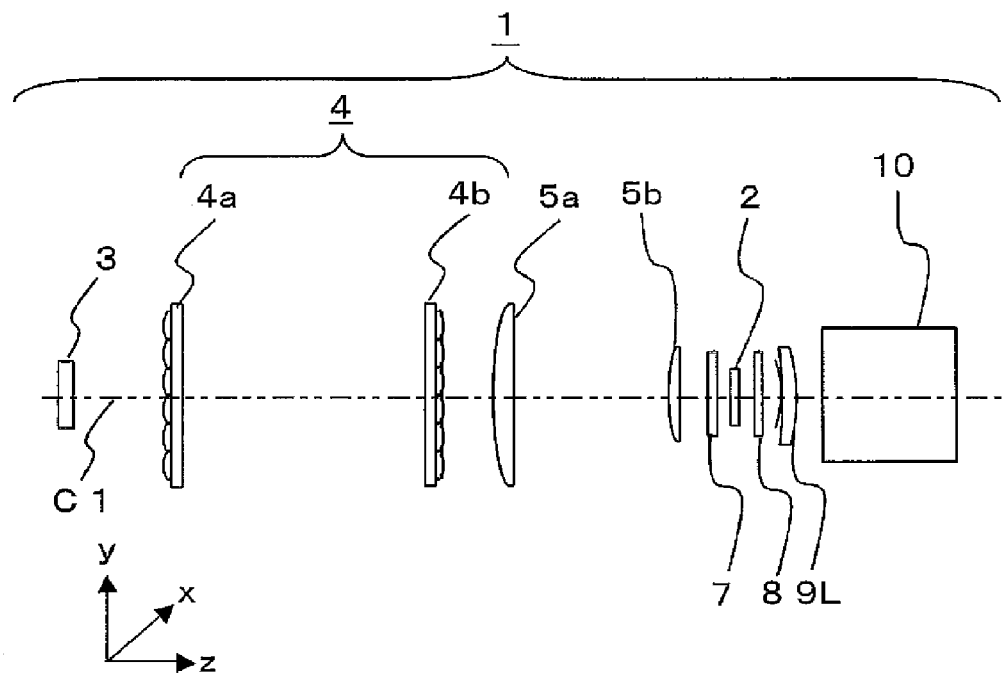
FIG. 1 is a view illustrating a configuration of a projection-type liquid-crystal display device according to Embodiment 1 of the present invention.

FIG. 1 is a configuration view of a polarization optical system according to Embodiment 1 and a projection-type liquid-crystal display device using the polarization optical system. In this figure, a projection-type liquid-crystal display device 1 includes a liquid-crystal light valve 2, a light source 3 for emitting light to the liquid-crystal light valve 2, an integrator optical system 4 arranged on an optical path from the light source 3 to the liquid-crystal light valve 2, a condenser lens 5a arranged downstream of the integrator optical system 4, and a field lens 5b arranged downstream of the condenser lens 5a. Moreover, the polarization optical system includes a flat light-incident-side polarization plate (first polarization plate 7) for transmitting specified linearly-polarized light (for example, s-polarized light) included in light outputted from the field lens 5b, a light-exit-side polarization plate 8 for transmitting linearly-polarized light (p-polarized light), whose polarizing axis is different by 90 degrees from the first polarization plate 7, included in light outputted from the liquid-crystal light valve 2, and a lens, provided with a polarization film, (a second polarization plate 9L), having a concave face (corresponding to a spherical surface defined by the center of the light-exit end of the liquid-crystal light valve 2 and by the radius of the optical length therefrom) facing the light-exit face of the liquid-crystal light valve, for transmitting linearly-polarized light (p-polarized light) whose polarization axis is different by 90 degrees from the first polarization plate 7.

Here, the projection-type liquid-crystal display device 1 further includes a projection optical system 10 arranged downstream of the second polarization plate 9L, and a screen (not illustrated) arranged downstream of the projection optical system 10. In FIG. 1, although the configuration with respect to only one optical path for one-color light is represented, the respective configuration elements 2-9L for each color of red, green, and blue may be included, whereby, after light beams corresponding to each of color images have been synthesized by an optical synthesis element (not illustrated), the images may be projected on the screen by the projection optical system 10.

Next, each component is explained. In order to simplify the explanation, components other than the polarization optical system are explained first.

Regarding the light source 3, although an LED as one of solid light sources is used here as an example, a high-pressure mercury lamp, a xenon lamp, an electrodeless discharge lamp, or a laser beam may also be used. However, it is preferable that light emitted from the light source 3 is approximately parallel; therefore, some ingenuity is needed, for example, a collimator lens is needed for an LED, while a parabolic mirror is needed for a lamp.

Each of a first lens array 4a and a second lens array 4b of the integrator optical system 4 is configured in such a way that rectangular convex lenses (also referred to as a lens cell or a cell) each having the long side along the x-axis and the short side along the y-axis are arranged in a plurality of lines and columns (in a matrix form). Each of a plurality of convex lenses of the first lens array 4a and each of a plurality of convex lenses of the second lens array 4b corresponds to each other, and each pair of the corresponding convex lenses is arranged to face each other along the z-axis (an optical axis C1 orientation).

Here, although the lens arrays have been used as an example of the integrator optical system, columnar optical elements (a rod integrator) may also be used. However, in such case, in a case in which a solid-state light source such as an LED is used, in order to condense light flux in the columnar optical elements, some ingenuity is needed, such as arranging a condenser lens set downstream of the light source 3 or arranging the columnar optical elements just following the light source 3. Meanwhile, in a case in which a lamp is used, some ingenuity is needed, such as using an elliptical lamp or arranging a condenser lens downstream of a parabolic lamp.

The condenser lens 5a superimposes onto the liquid-crystal light valve 2 the divided light fluxes outputted from the integrator optical system 4. Thereby, regarding the light emitted from the light source 3, the illuminance distribution in the cross-sectional plane perpendicular to the optical axis C1 is equalized on the liquid-crystal light valve 2. That is, the integrator optical system 4, the condenser lens 5a, and the field lens 5b constitute an illumination optical system for converting light from the light source 3 into that having a predetermined illuminance distribution.

As the liquid-crystal light valve 2, for example, a transmission-type liquid-crystal light valve is used. In the liquid-crystal light valve 2, a lot (for example, several hundred thousands) of liquid-crystal display elements each correspond to each of pixels with respect to imaging light to be projected is planarly arranged. By operating each liquid-crystal display element according to each of pixel information signals, the liquid-crystal light valve 2 converts the light incident thereon into the imaging light. Regarding the outputted imaging light, the image is enlarged by the projection optical system 10, and projected onto the screen.

Figure 2:
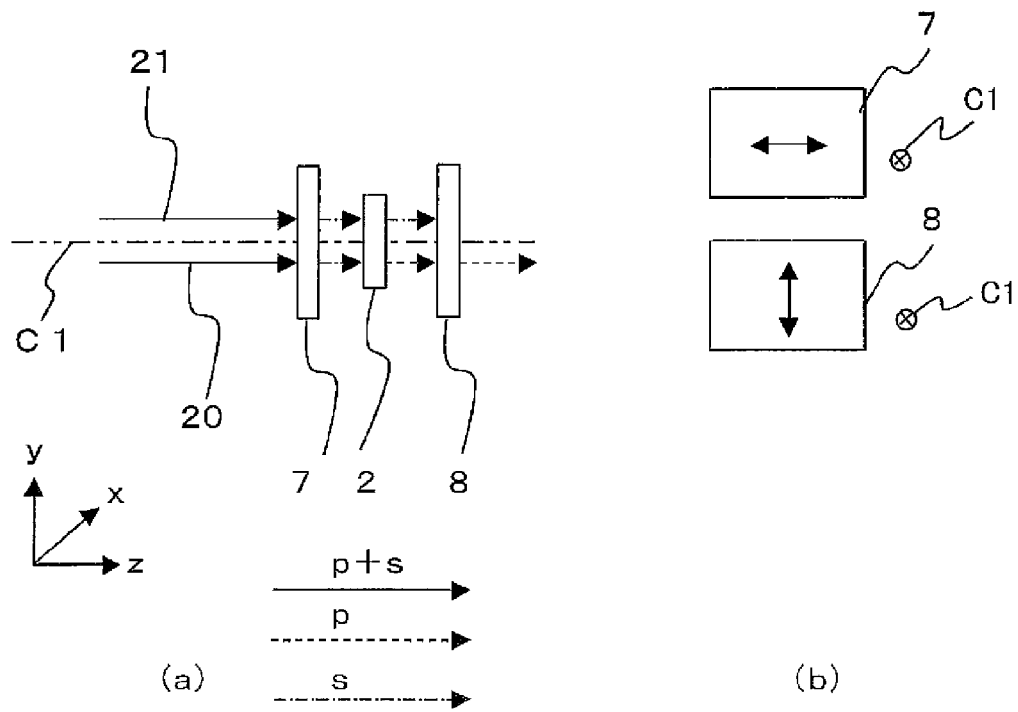
FIG. 2 includes views explaining an operation of a polarization optical system according to Embodiment 1 of the present invention.
Figure 3:
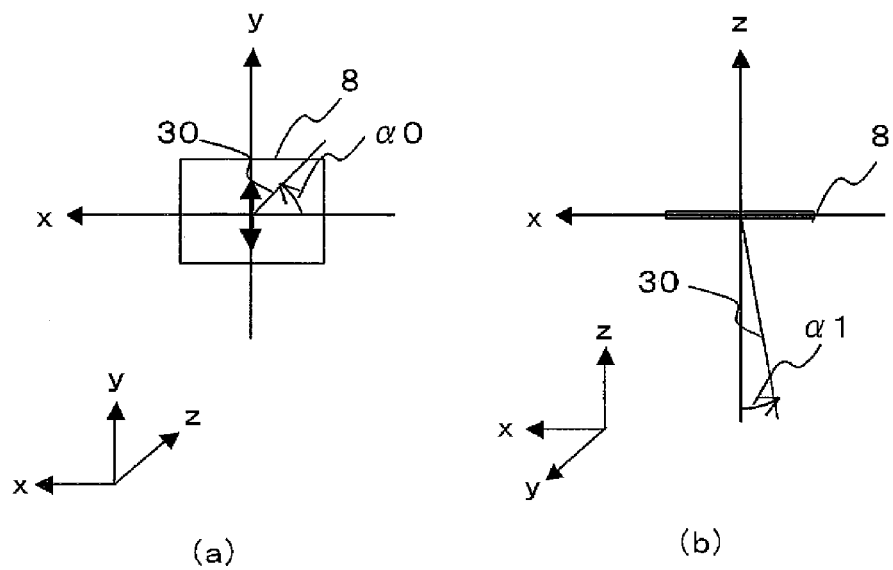
FIG. 3 includes views explaining an operation of the polarization optical system according to Embodiment 1 of the present invention.
Figure 4:
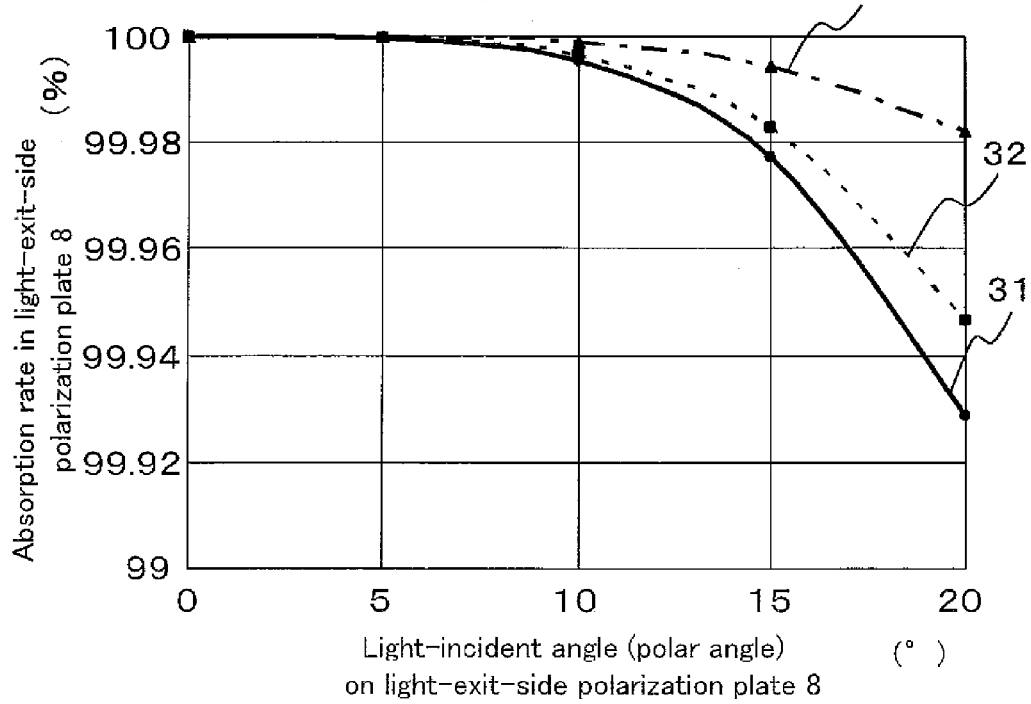
FIG. 4 is a graph representing relationships between incident angles (polar angles) of light beams incident on a polarization plate and light absorption rates.

Next, the polarization optical system is explained; here, before the polarization optical system according to Embodiment 1 is explained, portions common to those in a conventional system are explained using FIG. 2-FIG. 4.

FIG. 2 includes views explaining an operation of the first polarization plate 7, the liquid-crystal light valve 2, and the light-exit-side polarization plate 8. Here, components upstream of the first polarization plate 7 and downstream of the light-exit-side polarization plate 8 are omitted for convenience. In FIG. 2(a), when randomly polarized light that is not linearly polarized light is incident on the first polarization plate 7, a light-beam locus 20 when the light flux reaches the downstream projection optical system 10 omitted in the figure, and a light-beam locus 21 when the light flux does not reach the system are represented In FIG. 2(b), an example of optic axes (absorption axes) of the first polarization plate 7 and the light-exit-side polarization plate 8 is represented (arrows indicate the optic axes). When the s-polarized light is transmitted through the first polarization plate 7, because the optic axis (absorption axis) of the light-exit-side polarization plate 8 is different by 90 degrees from that of the first polarization plate 7, the s-polarized light is absorbed. That is, only the light flux, included in light having passed through the first polarization plate 7, whose polarization axis is rotated by 90 degrees (converted to the p-polarized light) by the liquid-crystal light valve 2 reaches the projection optical system 10. The outputted s-polarized light not having been modulated is absorbed by the light-exit-side polarization plate 8; accordingly, it does not reach the projection optical system 10. However, in a case in which the s-polarized light is angularly incident on the light-exit-side polarization plate 8, because the polarization axis of the angularly s-polarized light is angular to the optic axis (absorption axis) of the light-exit-side polarization plate 8, a case may occur in which the light cannot be completely absorbed, which is described later in detail.

Here, a case has been described in which the s-polarized light is transmitted through the first polarization plate 7; however, it may be configured in such a way that the p-polarized light is transmitted through the first polarization plate 7, while the s-polarized light is transmitted through the second polarization plate 9L (when the light-exit-side polarization plate 8 is included, the s-polarized light is made to also pass through the light-exit-side polarization plate 8). Moreover, in order to improve the system contrast, an optical compensation plate, for example, as disclosed in Paragraph 0021 of Japanese Laid-Open Patent Publication No. 2001-42314, is preferable to be arranged between the first polarization plate 7 and the liquid-crystal light valve 2, or between the liquid-crystal light valve 2 and the light-exit-side polarization plate 8. Because an optical compensation plate has an operation for compensating phase difference generated by the liquid-crystal light valve 2, the component is essential for improving the system contrast. However, the optical compensation plate need not be tilted as described in Paragraph 0021 of Japanese Laid-Open Patent Publication No. 2001-42314.

FIG. 3 includes views explaining angular components of incident light from the liquid-crystal light valve 2 onto the light-exit-side polarization plate 8, in which a state viewed from the z-axis is represented in FIG. 3(*a*), while a state viewed from the y-axis is represented in FIG. 3(*b*). In this figure, light 30 is the s-polarized one having a polarization axis parallel to the optic axis (absorption axis) of the light-exit-side polarization plate 8 (corresponding to emitted light not having been modulated by the liquid-crystal light valve, after passing through the first polarization plate 7), and a case of a state is represented in which the light is incident with an angle α0 on the x-y plane (azimuth angle), and with an angle α1 on the z-x plane (incident angle on the z-y plane). Here, in a case in which the azimuth angle α0 is geometric-optically close to 0 degree or 90 degrees (including 180 degree shift), that is, in a case in which light is incident from either the horizontal or vertical direction with respect to the optic axis (absorption axis), if the polarization axis of the s-polarized light is projected onto the x-y plane in the x-y-z space, the axis becomes approximately parallel to the optic axis (absorption axis) of the light-exit-side polarization plate 8; therefore, because the absorption efficiency of the light-exit-side polarization plate 8 is relatively high, the light intensity little varies against the incident angle. Here, when the polarization axis of the light 30 is projected onto the x-y plane, the axis has an angle other than that of 0 degree or 90 degrees (including 180 degree shift) with respect to the optic axis (absorption axis) of the light-exit-side polarization plate 8. That is, the polarization axis of the light 30 is not parallel to the absorption axis; therefore, a part of the light passes through the light-exit-side polarization plate 8.

Therefore, because the polarization axis of the light 30 varies depending on both the azimuth angle and the incident angle (polar angle), when the azimuth angle of the incident light is within a predetermined range (an angle approaching 45 degrees assuming a range from 0 degree to 90 degrees as a unit), the absorption rate decreases with increasing the incident angle (polar angle).

Here, the absorption rates of the light beams are represented in FIG. 4, in a case of the incident angle (polar angle) α1 of light beam incident on the light-exit-side polarization plate 8 being varied for 0, 5, 10, 15, and 20 degrees when the azimuth angles α0 are 15 degrees (or 75 degrees, as represented by a curve 33), 30 degrees (or 60 degrees, as represented by a curve 32), and 45 degrees (as represented by a curve 31). The vertical axis represents the absorption rate, while the horizontal axis represents the incident angle (polar angle) α1. Here, in cases of α0 being 0 degree and 90 degrees, the absorption rate is 100% as described above; therefore, the properties are not represented in the figure. Moreover, the absorption efficiencies periodically vary, as a unit, in a range of α0 being from 0 degree to 90 degrees, in which the absorption efficiencies in ranges of α0 being 0-90 degrees, 90-180 degrees, 180-270 degrees, and 270-360 degrees are equivalent to each other; therefore, the efficiencies are represented only with respect to the range of 0-90 degrees. As an example of the general transmittance of a polarization plate, with respect to a light beam whose incident angle is 0 degree, the transmittance of p-polarized light (effective light) is 86%, while that of s-polarized light (needless light) is 0.02% (absorption rate: 99.98%). That is, the ratio between the transmittance at the maximum brightness and that when the light is shielded, which represents the contrast value, becomes 86:0.02=4300. On the other hand, in FIG. 4, in a case of the azimuth angle being 45 degrees (curve 31), when the incident angle increases up to around 20 degrees, the absorption rate decreases to 99.94%. The increase of the transmittance in this case is approximately 0.06%; however, the contrast value becomes approximately 86:(0.02+0.06)=1075; therefore, the contrast decreases to approximately a quarter thereof.

Here, the light-exit-side polarization plate 8 is generally arranged close to the liquid-crystal light valve 2. Accordingly, light flux having a light-incident angle specified by an F-number of the illumination optical system (effective incident angle of light flux incident on the liquid-crystal light valve 2) is incident on the light-exit-side polarization plate 8. In the projection-type liquid-crystal display device 1 according to the present invention, a case is assumed in which the F-number of the illumination optical system is larger than "F 1.8", while the effective angle of "F 1.8" is approximately 16 degrees. Regarding the curve 31 in the figure, when the light-incident angle α1 is 16 degrees, the absorption rate is 99.96%; that is, the light amount of 0.04% is transmitted; therefore, the contrast value is approximately 86: (0.02+0.04)=1430, namely decreasing to approximately one-third.

Figure 5:
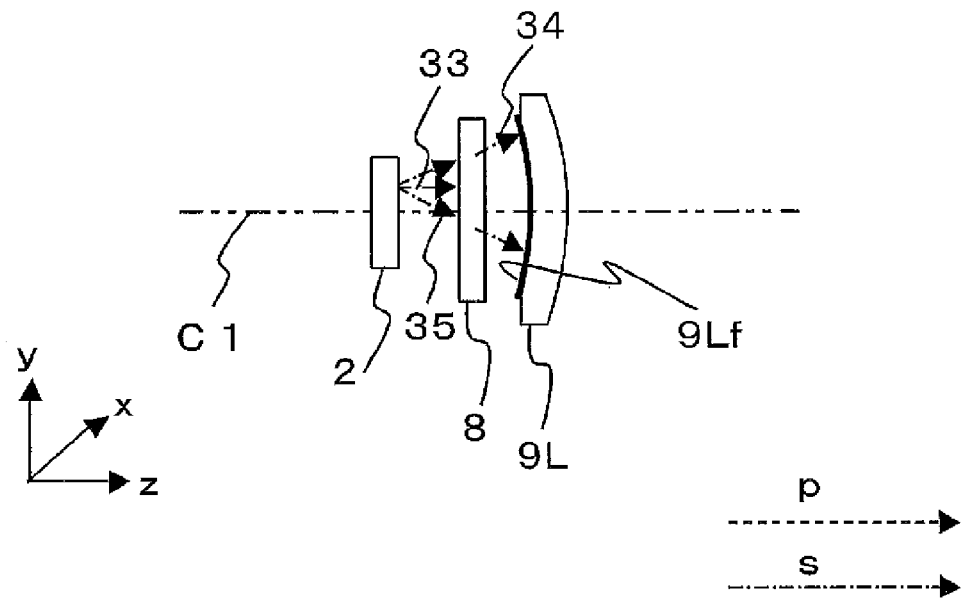
FIG. 5 is a view explaining a configuration of the polarization optical system according to Embodiment 1 of the present invention.

Next, the second polarization plate 9L, which is a feature of the present invention, is explained using FIG. 5. FIG. 5 represents a relationship among the liquid-crystal light valve 2, the light-exit-side polarization plate 8, and the second polarization plate 9L. The light flux outputted from the center of the light-exit face of the liquid-crystal light valve 2 is incident at an azimuth angle corresponding to the position on the incident face of the light-exit-side polarization plate 8. Therefore, in an area more than a predetermined distance apart from the center of the incident face of the light-exit-side polarization plate 8, portions arise around positions of 45 degrees, as the distribution peak, with respect to the axis vertical or horizontal to the optic axis (absorption axis), where the absorption rate of the s-polarized light is decreased. A state is represented in FIG. 5, in which the s-polarized light (in the right portion of the light-exit-side polarization plate 8 in the figure) being unnecessary light, included in light beams 34 and 35, without having been absorbed in the light-exit-side polarization plate 8 and passed therethrough is absorbed by the second polarization plate 9L, accordingly the light does not reach the projection optical system 10, and consequently the system contrast can be improved. As represented in this figure, because the light flux outputted from the liquid-crystal light valve 2 radially spreads from the optical axis C1 as a center, the light flux has an angular distribution; however, by determining, in such a way that the light-incident angle on the second polarization plate 9L becomes perpendicular thereto, the face shape of a light-incident face 9Lf (strictly, a face where the optic axis (absorption axis) is formed) on which the light from the liquid-crystal light valve 2 is incident, the contrast efficiency can be improved. Here, a light beam 33 represents a main light beam of the light flux outputted from the liquid-crystal light valve 2, which is absorbed by the light-exit-side polarization plate 8 because of the light-incident angle being close to 0 degree. Because a light beam 34 and a light beam 35 are light in the periphery of the liquid-crystal light valve 2, which are outputted therefrom with a certain angle, a part of the light flux having a predetermined azimuth angle and a predetermined incident angle (polar angle) on the incident face of the light-exit-side polarization plate 8 is transmitted therethrough. However, because the light beam 34 and the light beam 35 each are almost perpendicular to the light-incident face 9Lf of the second polarization plate 9L, the light-incident angle with respect to the second polarization plate 9L is decreased; therefore, the absorption efficiency is improved, and as a result, the contrast can be improved.

Figure 6:
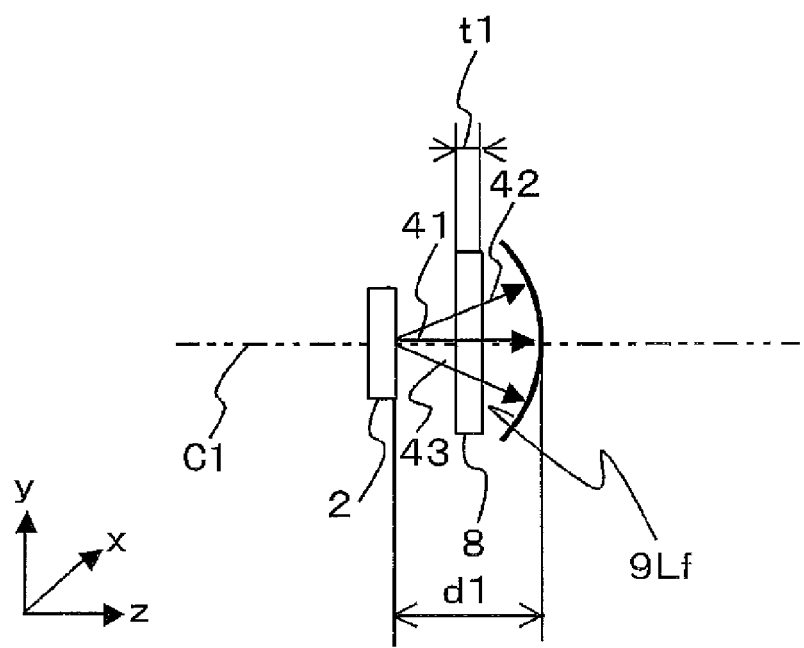
FIG. 6 is a view explaining a configuration of the polarization optical system according to Embodiment 1 of the present invention.

Generally, regarding the illumination optical system between the light source 3 and the liquid-crystal light valve 2, the light intensity is highest at the center of liquid-crystal light valve 2. Therefore, the most suitable shape of the face (actually, the face shape of the light-incident face 9Lf in Embodiment 1) where the optic axis (absorption axis) of the second polarization plate 9L is formed is a spherical face having the curvature radius equal to the distance between the liquid-crystal light valve 2 and the second polarization plate 9L. FIG. 6 represents a cross-sectional shape, on the y-z plane at the center in the x direction, of the liquid-crystal light valve 2, the light-exit-side polarization plate 8, and the light-incident face 9Lf of the second polarization plate 9L, and represents outputted light from the center of the liquid-crystal light valve 2. In this figure, the lengths of arrows 41, 42, and 43 indicating the outputted light are equal to each other, which are equivalent to the curvature radius of the concave light-incident face 9Lf of the second polarization plate 9L. Therefore, the outputted light indicated by the arrows 41, 42, and 43 is perpendicularly incident on the light-incident face 9Lf, accordingly, differing from a case of the light-exit-side polarization plate 8, the light-incident angle and the azimuth angle are not varied depending on the position on the light-incident face 9Lf, and therefore, the s-polarized light can be stably absorbed. However, when the light-exit-side polarization plate 8 is provided, because the optical length, which is the optical distance, is varied by an effect of the light-exit-side polarization plate 8, providing that the distance from the liquid-crystal light valve 2 to the second polarization plate 9L is d1, the thickness of the light-exit-side polarization plate 8 is t1, and the refractive index is n1, the curvature radius R1 (=optical distance) of the light-incident face 9Lf of the second polarization plate 9L can be expressed by Equation 1. Here, the thickness of the polarization plate is generally approximately 0.5 mm, which is a negligible level. The most suitable shape (curvature radius) of the light-incident face 9Lf of the second polarization plate 9L may be determined using the characteristics of the light intensity distribution with the light-incident angle on the light-exit-side polarization plate 8 from the illumination optical system.

$$R1 = d1 + t1 \times ((1/n1) - 1)$$ Equation 1.

However, due to the relation between the size of the light-exit end (face) of the liquid-crystal light valve 2 and the distance d1 from the liquid-crystal light valve 2 to the polarization plate 9L, the curvature radius R1 decreases, so that a case may occur in which Equation 1 is not established because of its structure. Moreover, with respect to light outputted from the periphery of the light-exit end of the liquid-crystal light valve 2 (edge portions on the plane face), a case may occur in which a curvature radius larger than the curvature radius R1 obtained by Equation 1 is preferably used. Therefore, considering the size of the light-exit face of the liquid-crystal light valve 2, the upper limit of a range of the curvature radius R1 where light not having been modulated by the liquid-crystal light valve 2 can be effectively absorbed has been calculated as follows. A case is described in which the light-exit-side polarization plate 8 is removed for convenience.

Figure 7:
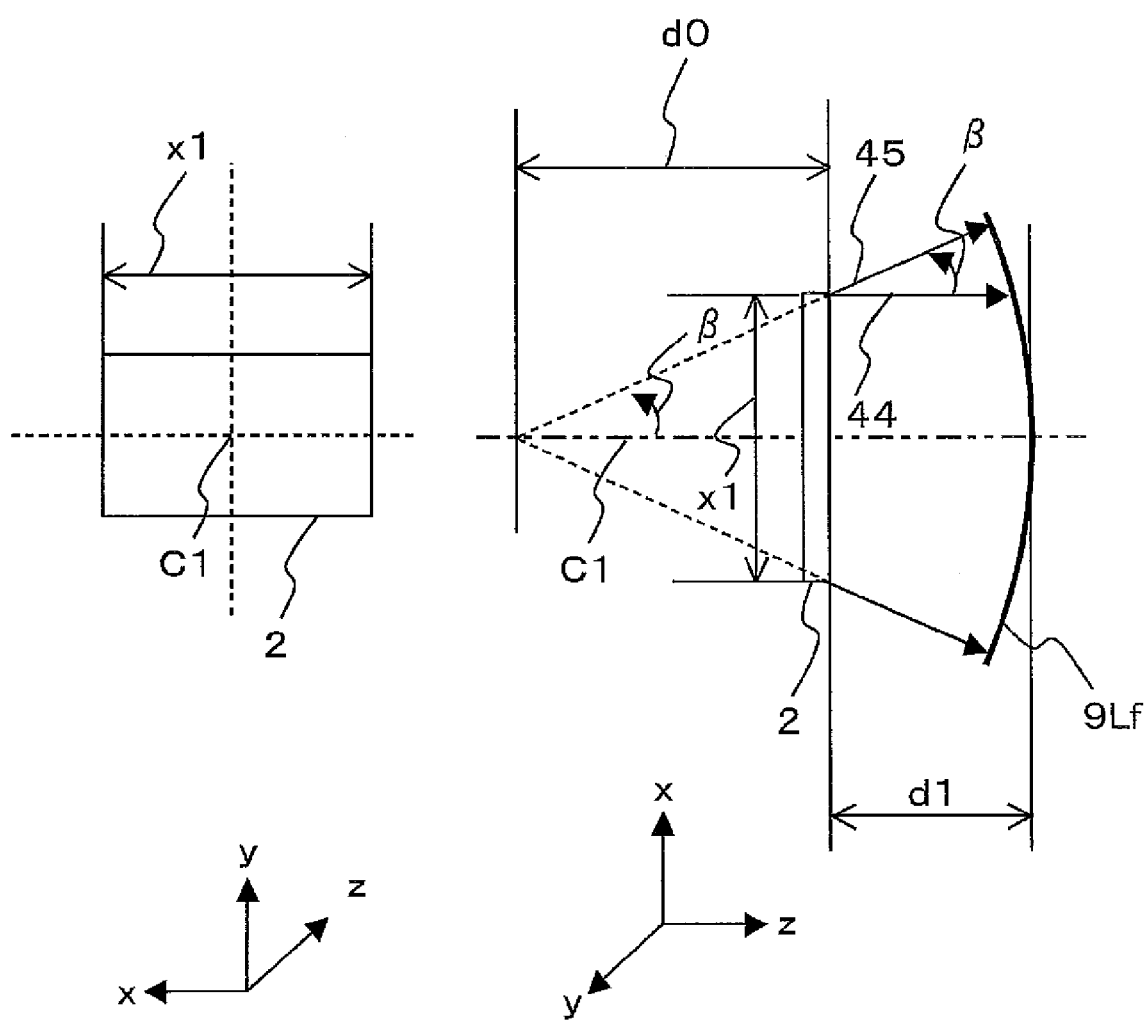
FIG. 7 is a view explaining a configuration of the polarization optical system according to Embodiment 1 of the present invention.

The size of the light-exit end of the liquid-crystal light valve 2, and the locus of light beams at positions most distant from the optical axis C1 of the liquid-crystal light valve 2 along the x-axis are represented in FIG. 7. It is assumed that the longitudinal length (x-axis direction) of the liquid-crystal light valve 2 is given by x1, the distance from the light-exit end of the liquid-crystal light valve 2 to the second polarization plate 9L is given by d1, and the effective divergence angle (determined by the F-number of the illumination optical system) from the liquid-crystal light valve 2 is given by B. Here, an arrow 44 indicates a main light beam outputted from a position most distant from the optical axis C1 of the liquid-crystal light valve 2 in the x-axis direction (peripheral portion in the x-axis), and an arrow 45 indicates effective divergence light (peripheral light). In a case of FIG. 7, assuming that the light beam indicated by the arrow 45 is outputted from the optical axis C1, the distance d0 from the assumed light-exit source to the light-exit end of the liquid-crystal light valve 2 can be expressed by Equation 2. Therefore, the most suitable curvature radius R1x, of the light-incident face 9Lf of the second polarization plate 9L, for the light beam from the peripheral portion of the light-exit end of the liquid-crystal light valve 2 is expressed by Equation 3.

$$d0 = (x1/2)/\tan \beta$$ Equation 2.

$$R1x = d0 + d1$$ Equation 3.

Accordingly, by setting the curvature radius R1 of the light-incident face 9Lf of the second polarization plate 9L to a value in a range expressed by Equation 4, an effect can be obtained in which light not having been modulated by the liquid-crystal light valve 2 is effectively absorbed.

$$d1 \leq R1 \leq d1 + (x1/2)/\tan \beta$$ Equation 4.

Here, as described above, in the face of the light-exit end of liquid-crystal light valve 2, because the intensity of light from the center is highest, the light absorption rate tends to be higher when the value of the curvature radius R1 is close to d1 suitable for light from the center than when the value is close to d1+(x1/2)/tan β suitable for light from the peripheral portion.

Moreover, in Equation 4, although the effect of the light-exit-side polarization plate 8 is not considered for convenience, when the thickness and the refractive index of the light-exit-side polarization plate 8 are considered, t1×((1/n1)−1) is to be added to both the left-hand side and the right-hand side of Equation 4.

In Embodiment 1, because the second polarization plate 9L has been formed by a polarization film being attached to a concave lens, imaging quality of the projection optical system 10 is affected, that is, the polarization optical system plays a part in the function of the projection optical system. Therefore, the projection optical system 10 is needed to be designed considering the optical characteristics of the second polarization plate 9L including the light-incident face 9Lf having the above-described curvature radius. Moreover, a thin concave-shaped transparent plate may be also used as a second polarization plate 9S; however, because the optical characteristics are affected also in that case, the projection optical system 10 is needed to be designed considering the optical characteristics of the second polarization plate 9S.

Figure 8:
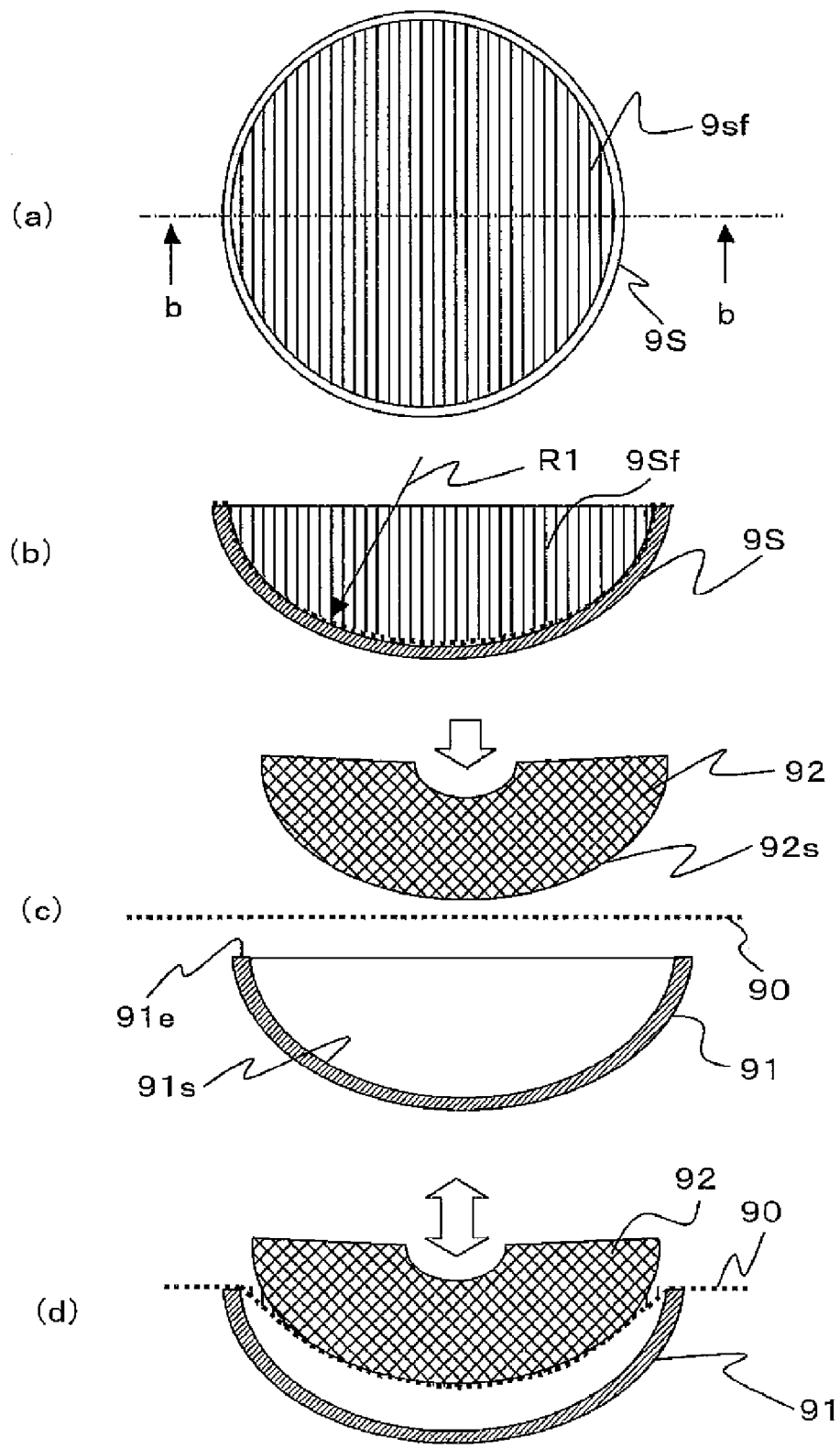
FIG. 8 includes views explaining a configuration and a production method of the polarization optical system according to Embodiment 1 of the present invention.

Here, a configuration of the second polarization plate 9L or 9S whose part having the polarization function is concave-shaped and a manufacturing method therefor are explained. A configuration of and a manufacturing method for the second polarization plate 9S are illustrated in FIG. 8; in which FIG. 8(a) is a plan view of the second polarization plate 9S (viewed from z-axis direction), FIG. 8(b) is a cross-sectional view along the b-b line in FIG. 8(a), and FIG. 8(c) and FIG. 8(d) represent cross-sectional views during a manufacturing process thereof. In FIG. 8(a), and FIG. 8(b), a light-incident face 9Sf of the second polarization plate 9S has a spherical surface whose curvature radius R1 is the distance from the center of the liquid-crystal light valve 2, and a polarization film having unidirectional optic axes (absorption axes) is pasted to that surface, so that the optic axes (absorption axes) are arranged, like latitude lines of a globe, on the light-incident face 9Sf.

Next, the manufacturing method is explained. As represented in FIG. 8(c), a transparent plate 91, made of transparent material, whose surface 91s is spherical (concave shaped) with the radius R1 (exactly, a value obtained by the thickness of a polarization film 90 being excluded), and whose thickness is uniform is pasted to the polarization film 90. First, a convex-shaped mold 92 whose surface 92s corresponds to the surface 91s of the transparent plate 91 is pressed against the polarization film 90 in a state of the polarization film 90 being contacted to an edge 91e of the transparent plate 91. As represented in FIG. 8(d), a portion, located inside the edge 91e, of the polarization film 90 is pressed, while being stretched along the shape of the surface 92s of the mold 92, against the surface 91s of the transparent plate 91; then, after heat treatment is performed, the portion is adhered to the transparent plate 91. After the mold 92 is removed, when a portion, located outside the edge portion 91e, of the polarization film 90 is cut off the second polarization plate 9S represented in FIG. 8(a) and FIG. 8(b) is completed. Here, in order to improve the adhesiveness between the surface 91s of the transparent plate 91 and the polarization film 90, the adhesion may be performed in vacuum. In this case, if the polarization film 90 is pressed to the surface 91s of the transparent plate 91 by air pressure, etc. instead of the mold 92, the polarization film 90 can be more uniformly expanded. Here, although a case in which the transparent plate 91 is used has been explained, the second polarization plate can be similarly produced also by using a convex lens.

As described above, the polarization optical system according to Embodiment 1 is provided with the first polarization plate 7, arranged at the light-incident side of the liquid-crystal light valve 2, for transmitting the first linearly-polarized light (s-polarized light) included in the light outputted from the illumination optical system (4, 5a, and 5b) to the liquid-crystal light valve 2, and the second polarization plate 9L (or 9S), arranged at the light-exit side of the liquid-crystal light valve 2, for transmitting the second linearly-polarized light (p-polarized light), different from the first linearly-polarized light (s-polarized light), included in the imaging light outputted from the liquid-crystal light valve 2 to the projection optical system, in which the second polarization plate 9L (or 9S) is configured so as to have a face concave toward the light-incident face (9Lf or 9Sf) of the liquid-crystal light valve 2; therefore, in the light, having a certain angle, outputted from the liquid-crystal light valve 2, an angle with the concave-shaped light-incident face (9Lf or 9Sf) decreases, so that the light not having been modulated by the liquid-crystal light valve 2 can be effectively absorbed, and consequently the contrast of the system is improved.

Especially, the concave shape of the light-incident face (9Lf or 9Sf) of the second polarization plate (9L or 9S) is configured so as to be a spherical face whose curvature radius is the optical distance (R1 in Equation 1) from the liquid-crystal light valve 2 to the second polarization plate (9L or 9S); therefore, the light outputted from the center of the liquid-crystal light valve 2 is incident perpendicularly at every position on the light-incident face (9Lf or 9Sf), so that the light not having been modulated by the liquid-crystal light valve 2 can be effectively absorbed, and consequently the system contrast is improved.

If the curvature radius R1 of the light-incident face 9Lf of the second polarization plate 9L is alternatively configured to be set within a range expressed by Equation 4:

$$d1 \leq R1 \leq d1 + (x1/2)/\tan \beta \qquad \text{Equation 4.}$$

where x1 is a longitudinal (x-directional) length of the light-exit end of the liquid-crystal light valve 2, d1 is a distance from the light-exiting end of the liquid-crystal light valve 2 to the second polarization plate 9L, and β is an effective divergence angle from the liquid-crystal light valve 2, the light not having been modulated by the liquid-crystal light valve 2 can be effectively absorbed.

The second polarization plate 9S or 9L is configured by the polarization film 90 being attached to the surface 91s of the transparent plate 91 or the concave lens; therefore, the system can be easily manufactured.

The light-exit-side polarization plate 8, whose incident face is flat, for transmitting the second polarized light (p-polarized light) different from the first polarized light (s-polarized light), is further arranged between the liquid-crystal light valve 2 and the second polarization plate (9L or 9S); therefore, the light not having been modulated by the liquid-crystal light valve 2 can be more effectively absorbed, and consequently the system contrast is improved.

In particular, the polarization axis of the second linearly-polarized light (p-polarized light) is set so as to be shifted by 90 degrees from that of the first linearly-polarized light (s-polarized light); therefore, the light not having been modulated by the liquid-crystal light valve 2 can be securely absorbed, and consequently the contrast is improved.

The optical compensation plate for compensating the phase difference of polarized light generated by the liquid-crystal light valve 2 is further arranged between the first polarization plate 7 and the liquid-crystal light valve 2, or between the liquid-crystal light valve 2 and the second polarization plate 8; therefore, the contrast of the system can be further improved.

Moreover, the projection-type liquid-crystal display device according to Embodiment 1 is provided with the first polarization plate 7, the liquid-crystal light valve 2, the light source 3 for emitting the light beam to emit the liquid-crystal light valve 2, the illumination optical system (4, 5a, and 5b) for emitting to the liquid-crystal light valve 2 the light beam emitted from the light source 3, the projection optical system for projecting on the screen the imaging light outputted from the liquid-crystal light valve 2 and the above-described polarization optical system including the first polarization plate 7 arranged at the light-incident side of the liquid-crystal light valve 2, and the second polarization plate (9L or 9S) arranged at the light-exit side of the liquid-crystal light valve 2; therefore, high-contrast images can be displayed.

In Embodiment 1, the concave-shaped light-incident face 9Sf or 9Lf having the optic axis (absorption axis) is formed at the light-incident-side face of the second polarization plate 9S or 9L; however, by attaching a polarization film 90 to the light-exit side of the convex-shaped face (spherical face whose curvature radius is an optical distance from the liquid-crystal light valve 2 to the light-exit face), a concave-shaped light-incident face having a polarization function may be formed at the light-exit-side face. Moreover, the light-exit-side face of the first polarization plate 7 provided at the light-incident side of the liquid-crystal light valve 2 may be formed in concave shape, or the light-incident-side face thereof may be formed in convex shape; in these cases, the curvature radius of the spherical face may also be an optical distance to the light-incident-side face of the liquid-crystal light valve 2.

Embodiment 2

Figure 9:
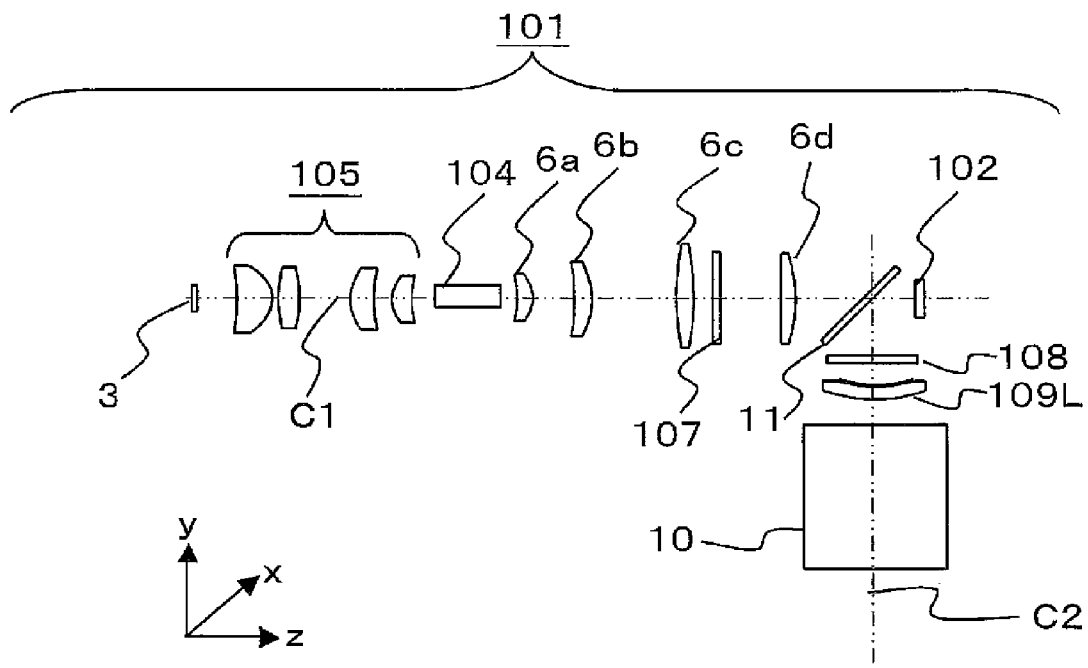
FIG. 9 is a view illustrating a configuration of a projection-type liquid-crystal display device according to Embodiment 2 of the present invention.

FIG. 9 is a configuration view of a polarization optical system according to Embodiment 2, and a projection-type liquid-crystal display device using the polarization optical system. As illustrated in this figure, a projection-type liquid-crystal display device 101 includes a reflection-type liquid-crystal light valve 102, the light source 3 for emitting light onto the reflection-type liquid-crystal light valve 102, a condenser lens set 105 arranged on an optical path from the light source 3 to the reflection-type liquid-crystal light valve 102, a columnar optical element 104 arranged downstream of the condenser lens set 105, and a four-piece relay lens set 6a-6d arranged downstream of the columnar optical element 104. The polarization optical system includes: a flat light-incident-side polarization plate (first polarization plate 107), arranged between the relay lens 6c and the projection optical system 10, for transmitting specified linearly-polarized light (for example, p-polarized light) included in light incident on the reflection-type liquid-crystal light valve 102; a reflection-type polarization plate 11, arranged, with a tilt angle of 45 degrees with respect to the optical axis C1, between the first polarization plate 107 and the reflection-type liquid-crystal light valve 102, for transmitting the p-polarized light, and reflecting imaging light outputted from the reflection-type liquid-crystal light valve 102 towards an optical axis C2 perpendicular to the optical axis C1; a light-exit-side polarization plate 108, arranged, along the optical axis C2, downstream of the reflection-type polarization plate 11, for transmitting linearly-polarized light (s-polarized light), whose polarization axis is parallel to the optic axis (absorption axis) of the first polarization plate 107, included in light outputted from the reflection-type liquid-crystal light valve 102; and a lens, to which a polarization film is attached, (second polarization plate 109L), whose light-incident face 109Lf is concave (corresponding to a spherical surface defined by the sphere center of the light-exit end of the reflection-type liquid-crystal light valve 102 and by the sphere radius of the optical distance therefrom), for transmitting the linearly-polarized light (s-polarized light) whose polarization axis is parallel to the optic axis (absorption axis) of the first polarization plate 107.

Here, also in Embodiment 2 as in Embodiment 1, the projection-type liquid crystal display device 101 further includes the projection optical system 10 arranged downstream of the second polarization plate 109L, and the screen (not illustrated) arranged downstream of the projection optical system 10. In FIG. 9, although the configuration with respect to only one optical path for one-color light is represented, the respective configuration elements other than the projection optical system 10 for each color of red, green, and blue may be included, whereby, after light beams corresponding to each of color images have been synthesized by an optical synthesis element (not illustrated), the images may be projected on the screen by the projection optical system 10.

Next, each component is explained. Here, with respect to components common to those in Embodiment 1, their explanation is omitted.

Regarding the light source 3, although an LED as one of solid light sources is used here as an example, a high-pressure mercury lamp, a xenon lamp, an electrodeless discharge lamp, and a laser beam may also be used. However, light emitted from the light source 3 is needed to be condensed in the columnar optical element 104.

Although the condenser lens set 105 is here formed by four pieces, the set may be configured by any number of pieces as long as the light can be condensed in the columnar optical element 104. When a light source such as an LED whose light divergence angle is relatively large is used, by using an aspherical lens as the first in the lens set, the light condensing efficiency in the columnar optical element 104 can be improved. When an aspherical lens is used, considering the effect of heat generation by the light source 3, a glass lens is preferably used. If a plastic lens is used, multiple coating layers for reducing the interfacial reflection effect of the lens may peel off due to the heat.

The columnar optical element 104 has a function for equalizing the light-intensity distribution in a cross-section (that is, in a plane perpendicular to the central light traveling along the optical axis C1) of the light after passing through the condenser lens set 105 (that is, for reducing its illuminance irregularity). As the columnar optical element 104, a rectangular-pole-shaped rod (that is, a pole whose cross-sectional shape is rectangular) or the like that is generally made of transparent material such as glass or resin and is configured in such a way that the inner side walls of the element are total reflection surfaces, or a pipe (tube) whose cross-sectional shape is rectangular, and which is formed by elements that are cylindrically combined in such a way that the inner faces are light reflection faces are used. When the columnar optical element 104 is the rectangular-pole-shaped rod, light is outputted from the light-exit end (light exit) thereof, after a plurality of times of light reflection operations has been performed using the total reflection operation of the interface between the transparent material and the air. While, when the columnar optical element 104 is the rectangular pipe, light is outputted from the light exit thereof, after a plurality of times of light reflection operations has been performed using the reflection on first-surface mirrors facing the inside thereof. In the columnar optical element 104, if an appropriate length is ensured along the light traveling direction, light reflected at the inside for a plurality of times is superimposed and emitted in the vicinity of the light-exit end of the columnar optical element 104; consequently, an approximately uniform light-intensity distribution can be obtained in the vicinity thereof. The light, from the light-exit end, having such approximately uniform light-intensity distribution is guided to the reflection-type liquid-crystal light valve 102 through the relay lens set 6a-6d.

Although the relay lens set 6a-6d is formed by four pieces, the set may be formed by three pieces as long as the main light beam incident on the reflection-type liquid-crystal light valve 102 is approximately parallel to the optical axis C1. That is, the illumination optical system (the columnar optical element 104, the condenser lens set 105, and the relay lens set 6a-6d) may be constituted as a telecentric optical system. Here, although the first polarization plate 107 is provided between the relay lenses 6c and 6d, because the first polarization plate 107 also has light-incident-angle dependency the plate is preferable to be arranged at a position, between the relay lenses 6a and 6d, where light components approximately parallel to each other are concentrated.

The reflection-type liquid-crystal light valve 102, in which a plurality (for example, several hundred thousands) of liquid-crystal display elements each corresponding to each pixel of imaging light projected is arranged in plane, converts the incident light into imaging light to be outputted by each of the liquid-crystal display elements being operated according to each of pixel information contents.

Next, the polarization optical system is explained.

Figure 10:
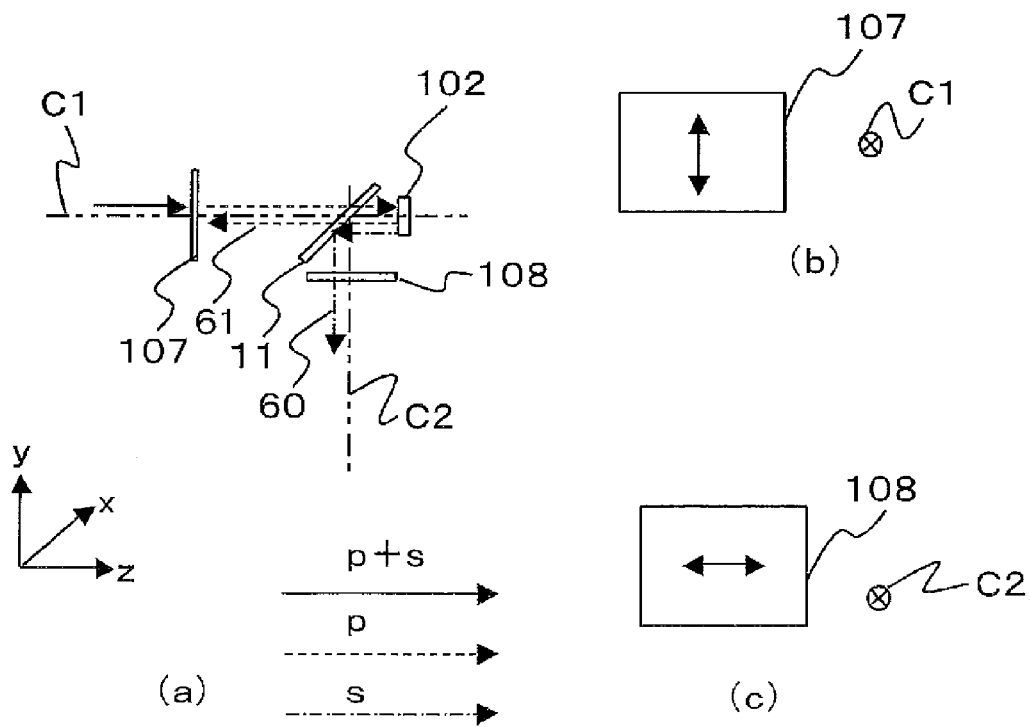
FIG. 10 includes views explaining an operation of a polarization optical system according to Embodiment 2 of the present invention.

FIG. 10 represents views explaining operations of the first polarization plate 107, the reflection-type polarization plate 11, the reflection-type liquid-crystal light valve 102, and the light-exit-side polarization plate 108. Here, the upstream stages of the first polarization plate 107 and the downstream stages of the light-exit-side polarization plate 108 are omitted for convenience. In a case in which randomly-polarized light is incident on the first polarization plate 107, a locus of light 60 when its light flux reaches the projection optical system 10 and a locus of light 61 when it does not reach are represented in FIG. 10(a). Examples of the optic axis (absorption axis) of the first polarization plate 107 and that of the light-exit-side polarization plate 108 are represented in FIG. 10(b) and FIG. 10(c), respectively (arrows indicate the optic axes). When p-polarized light is transmitted through the first polarization plate 107, the p-polarized light reaches the reflection-type liquid-crystal light valve 102. In the arriving p-polarized light, the outputted light 60 (that is s-polarized light and is to be effective imaging light) whose polarization axis has been rotated inside the reflection-type liquid-crystal light valve 102 is reflected by the reflection-type polarization plate 11, travels along the optical axis C2 perpendicular to the optical axis C1 (downward in the drawing), and is outputted towards the projection optical system 10 after having passed through the light-exit-side polarization plate 108 through which s-polarized light can be transmitted. On the other hand, the outputted light 61 (that is p-polarized light and is to be unnecessary light) whose polarization axis has not been rotated in the reflection-type liquid-crystal light valve 102 passes through the reflection-type polarization plate 11. However, although the operation is not illustrated in the drawings, because even the light 61 being the p-polarized light is partly reflected by the reflection-type polarization plate 11, a part of the light 61 being the unnecessary light reaches the light-exit-side polarization plate 108.

Because the light passing through the light-exit-side polarization plate 108 also has an angular distribution similar to that in Embodiment 1, a part of the unnecessary light in Embodiment 2 also passes through the light-exit-side polarization plate 108 similarly to that in FIG. 4 according to Embodiment 1. However, in Embodiment 2, by arranging the second polarization plate 109L downstream of the light-exit-side polarization plate 108 as represented in FIG. 9, the system contrast can be improved. The principle of the operation is the same as that described in Embodiment 1.

Figure 11:
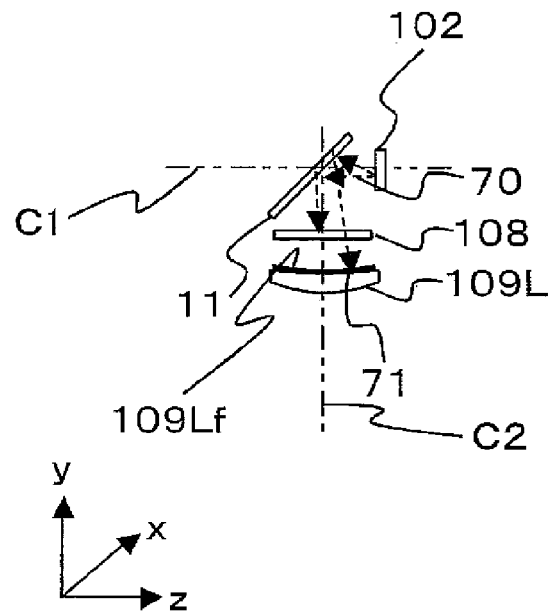
FIG. 11 is a view explaining a configuration of the polarization optical system according to Embodiment 2 of the present invention.

A view explaining an operation of the second polarization plate 109L is illustrated in FIG. 11. Here, upstream stages of the reflection-type polarization plate 11 and downstream stages of the second polarization plate 109L are omitted for convenience. Because the light flux outputted from the reflection-type liquid-crystal light valve 102 has the angular distribution similarly to that in Embodiment 1, by determining its shape in such a way that the light-incident angle on a light-incident face 109Lf becomes perpendicular thereto, the contrast can be improved. Here, a light beam 70 indicates the main light beam of the light flux outputted from the reflection-type liquid-crystal light valve 102, which is absorbed by the light-exit-side polarization plate 108. Light beams 71 indicate peripheral light which are outputted from the reflection-type liquid-crystal light valve 102 with a certain angle; therefore, a part of the beams passes through the light-exit-side polarization plate 108, and then is absorbed by the second polarization plate 109L. Because the light beams 71 each are approximately perpendicular to the light-incident face 109Lf of the second polarization plate 109L, if the polarization plate is assumed to be a flat plane, its light-incident angle dependency is small, so that the light absorption characteristics are excellent; as a result the contrast can be improved. Here, the optic axes (absorption axes) of the first polarization plate 107, the light-exit-side polarization plate 108, and the second polarization plate 109L each are shifted by 90 degrees from that in Embodiment 1; however, because the characteristics with respect to the absorption rate may be considered to be similar to those in Embodiment 1, a concept similar to that in Embodiment 1 may be applicable.

Figure 12:
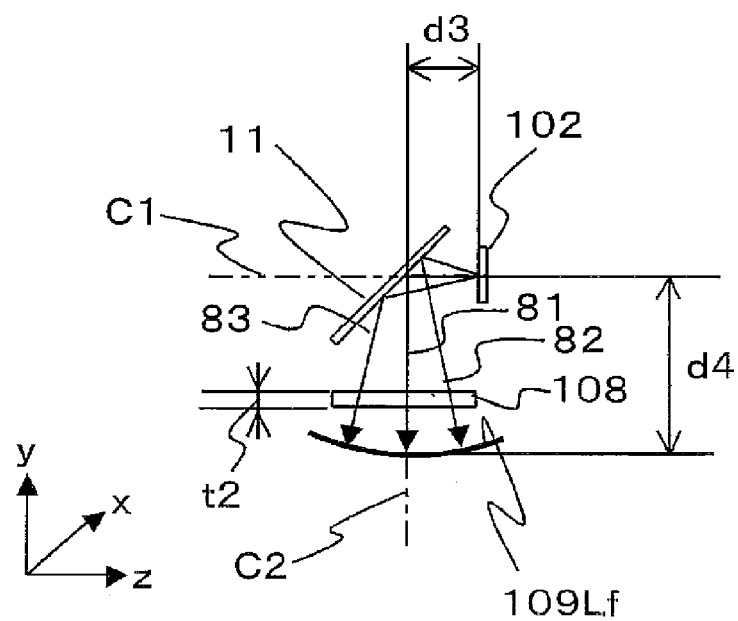
FIG. 12 is a view explaining a configuration of the polarization optical system according to Embodiment 2 of the present invention.

Even when the reflection-type liquid-crystal light valve 102 is used as in Embodiment 2, the light intensity is highest at the center of the reflection-type liquid-crystal light valve 102. Accordingly, the most suitable shape as the light-incident face 109Lf of the second polarization plate 109L is a curved face formed by a sphere whose curvature radius is the optical distance from the reflection-type liquid-crystal light valve 102 to the second polarization plate 109L as illustrated in FIG. 12. The reflection-type liquid-crystal light valve 102, the light-exit-side polarization plate 108, the reflection-type polarization plate 11, and the light-incident face 109Lf of the second polarization plate 109L are illustrated in FIG. 12. The lengths of arrows 81,82, and 83 indicating imaging light outputted from the center of the reflection-type liquid-crystal light valve 102 are equivalent to each other, and equal to the curvature radius of the light-incident face 109Lf of the second polarization plate 109L. Accordingly, the arrows 81, 82, and 83 each are perpendicularly incident on the light-incident face 109Lf at respective incident positions of the second polarization plate 109L; consequently, their incident angles each are approximately 0 degree at any position on the light-incident face 109Lf. However, because the actual distance and the optical distance (optical path) are different, due to the light-exit-side polarization plate 108, from each other, assuming that the distance from the reflection-type liquid-crystal light valve 102 to the reflection-type polarization plate 11 is d3, the distance from the reflection-type polarization plate 11 to the second polarization plate 109L is d4, the thickness of the light-exit-side polarization plate 108 is t2, and the refractive index is n2, the curvature radius R2 of the light-incident face 109Lf of the second polarization plate 109L can be expressed by Equation 5. Here, generally, the thickness of a polarization plate is approximately 0.5 mm, which is in a negligible level. The most suitable curved shape of the second polarization plate 109L may be determined using the characteristics of the light intensity distribution with respect to the light-incident angle on the light-exit-side polarization plate 108 of the illumination optical system.

$$R2 = d3 + d4 + t2 \times ((1/n2) - 1) \qquad \text{Equation 5.}$$

Here, the curvature radius R2 decreases due to a relationship between the light-exit-end size of the reflection-type liquid-crystal light valve 102 and the distance d4 from the reflection-type polarization plate 11 to the second polarization plate 109L similarly to that in Embodiment 1; consequently, a case may occur in which Equation 5 is not satisfied because of the structure. Regarding the light exited from the periphery (edge portions of the face), a case may occur in which a curvature radius larger than the curvature radius R2 obtained by Equation 5 is preferably used similarly to that in Embodiment 1. Accordingly, also in Embodiment 2, considering the light-exit-face size of the reflection-type liquid-crystal light valve 102, a range of the curvature radius R2 has been calculated in which light not having been modulated by the reflection-type liquid-crystal light valve 102 can be effectively absorbed. However, there is a difference in the configuration that the y-axis is the longitudinal axis of the reflection-type liquid-crystal light valve 102.

Figure 13:
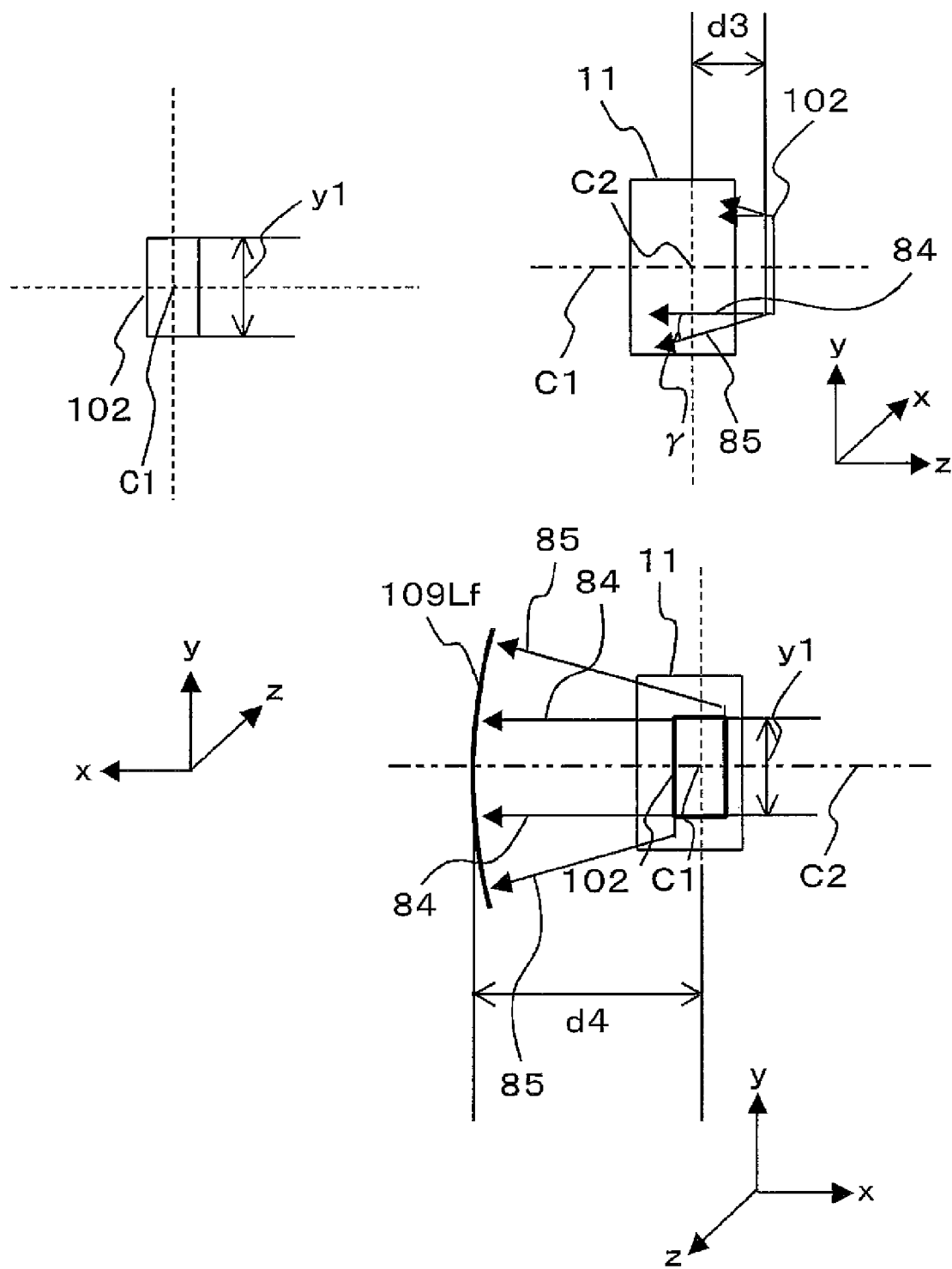
FIG. 13 includes views explaining a configuration of the polarization optical system according to Embodiment 2 of the present invention.

A light-exit-end size of the reflection-type liquid-crystal light valve 102 and the locus of the light beams at the positions most distant along the y-axis from the optical axis C1 of the reflection-type liquid-crystal light valve 102 are illustrated in FIG. 13. The length of the longitudinal axis y-axis) of the reflection-type liquid-crystal light valve 102 is set to be y1, the distance from the reflection-type liquid-crystal light valve 102 to the reflection-type polarization plate 11 is d3, the distance from the reflection-type polarization plate 11 to the second polarization plate 109L is d4, and the effective divergence angle from the reflection-type liquid-crystal light valve 102 is γ. Here, arrows 84 indicate main light beams exited from the position most distant along the y-axis from the optical axis C1 of the reflection-type liquid-crystal light valve 102, while arrows 85 indicate effective divergent light (peripheral light). In the case represented in FIG. 13, the light axes C1 and C2 bent by the reflection-type polarization plate 11 are assumed to be a single optical axis, and the light beam indicated by the arrow 85 is assumed to be exited from the optical axis C1, the distance d5 from an assumed light-exit source to the light-exit-end of the reflection-type liquid-crystal light valve 102 can be expressed by Equation 6. Therefore, with respect to the light beam from the periphery of the light-exit end of the reflection-type liquid-crystal light valve 102, the most suitable curvature radius R2x of the light-incident face 109Lf of the second polarization plate 109L can be expressed by Equation 7.

$$d5=(y1/2)/\tan\gamma \quad \text{Equation 6.}$$

$$R2x=d5+d3+d4 \quad \text{Equation 7.}$$

Therefore, if the curvature radius R2 of the light-incident face 109Lf of the second polarization plate 109L is set within a range expressed by Equation 8, an effect can be obtained in which the light not having been modulated by the reflection-type liquid-crystal light valve 102 is efficiently absorbed.

$$d3+d4 \leq R2 \leq d3+d4+(y1/2)/\tan\gamma \quad \text{Equation 8.}$$

Here, also in Embodiment 2, because the intensity of the light at the center of the light-exit-end face of the reflection-type liquid-crystal light valve 102 is highest, when the curvature radius R2 is close to the value of "d3+d4" suitable for light from the center than to the value of "d3+d4+(y1/2)/tan γ" suitable for light from the periphery, the absorption rate tends to be higher.

In Equation 8, although contribution of the light-exit-side polarization plate 8 is not considered for convenience, if the thickness and the refractive index of the light-exit-side polarization plate 8 are considered, "t2×((1/n2)−1)" is to be added to each of the left-hand and right-hand members of Equation 8.

As described above, the polarization optical system according to Embodiment 2 is configured in such a way that the reflection-type liquid-crystal light valve 102 is used as the liquid-crystal light valve, the reflection-type polarization plate 11, arranged between the first polarization plate 107 and the reflection-type liquid-crystal light valve 102, for transmitting the first linearly-polarized light (p-polarized light), and for reflecting the imaging light outputted from the reflection-type liquid-crystal light valve 102 is included, and the second polarization plate 109L is arranged downstream of the reflection-type polarization plate 11; therefore, most of the unnecessary light not having been modulated by the reflection-type liquid-crystal light valve 102 can be configured not to reach the projection optical system 10 by the reflection-type polarization plate 11, and, regarding the light, having a certain angle, outputted from the reflection-type liquid-crystal light valve 102, an angle with respect to the light-incident face 109Lf decreases, so that the light not having been modulated by the reflection-type liquid-crystal light valve 102 can be effectively absorbed, and consequently the system contrast can be improved.

Here, it is needless to say that the light-exit-side polarization plate 108 can be omitted also in Embodiment 2. Moreover, even though a projection-type liquid-crystal display device is configured using the polarization optical system according to Embodiment 2, a high-contrast image similar to that in Embodiment 1 can also be displayed.

In FIG. 9, by forming the light-exit-face side of the relay lens 6d downstream of the first polarization plate 107 concave, and by attaching to the light-exit-face side a polarization film having the same optic axis (absorption axis) as that of the first polarization plate 107, although their effect is lower than that using the second polarization plate 109L, the contrast can also be improved. That is, by arranging a lens whose shape is configured to have an angle approximately perpendicular to the incident angle of the light flux, and by attaching to the light-exit face of the lens a polarization film having the same optic axis (absorption axis) as that of the first polarization plate 107, an effect similar to that in each embodiment can be obtained.

Moreover, by arranging an optical compensation plate for compensating phase difference of polarized light generated by the reflection-type liquid-crystal light valve 102 between the reflection-type polarization plate 11 and the reflection-type liquid-crystal light valve 102, the contrast can be further improved.

What is claimed is:

1. A polarization optical system comprising:
    a first polarization plate, arranged at the light incident side of a liquid-crystal light valve, for transmitting first linearly-polarized light included in light incident on the liquid-crystal light valve from an illumination optical system; and
    a second polarization plate, arranged at the light exit side of the liquid-crystal light valve, for transmitting second linearly-polarized light, different from the first linearly-polarized light, included in imaging light emitted from the liquid-crystal light valve to a projection optical system, the second polarization plate having a concave face facing the light exit side of the liquid-crystal light valve,
    wherein the concave face of the second polarization plate is a spherical face whose radius is an optical distance from the liquid-crystal light valve to the second polarization plate.

2. The polarization optical system as recited in claim 1, wherein the concave face of the second polarization plate is a spherical face whose radius R1 is given by an equation:

$$d1 \leq R1 \leq d1+(x1/2)/\tan\beta$$

where x1 is a longitudinal length of the light exiting end of the liquid-crystal light valve, d1 is a distance from the light exiting end of the liquid-crystal light valve to the second polarization plate, and β is an effective divergence angle from the liquid-crystal light valve.

3. The polarization optical system as recited in claim 1, wherein the second polarization plate includes a transmission plate having the concave face and a polarization film attached to the concave face of the transmission plate.

4. The polarization optical system as recited in claim 1, wherein the second polarization plate includes a concave lens having the concave face and a polarization film attached to the concave face of the concave lens.

5. The polarization optical system as recited in claim 1, further comprising a polarization plate, whose incident face is flat, arranged between the liquid-crystal light valve and the second polarization plate, for transmitting the second linearly-polarized light different from the first linearly-polarized light.

6. The polarization optical system as recited in claim 1, wherein the polarization axis of the second linearly-polarized light is shifted by 90 degrees from that of the first linearly-polarized light.

7. The polarization optical system as recited in claim 1, further comprising an optical compensation plate, arranged between the first polarization plate and the liquid-crystal light valve, for compensating a polarized-light's phase difference generated by the liquid-crystal light valve.

8. The polarization optical system as recited in claim 1, further comprising an optical compensation plate, arranged between the liquid-crystal light valve and the second polarization plate, for compensating a polarized-light's phase difference generated by the liquid-crystal light valve.

9. The polarization optical system as recited in claim 1, wherein
- the liquid-crystal light valve is a reflection-type liquid-crystal light valve,
- the polarization optical system further comprises a reflection-type polarization plate, arranged between the first polarization plate and the reflection-type liquid-crystal light valve, for transmitting the first linearly-polarized light, and reflecting imaging light emitted from the reflection-type liquid-crystal light valve, and
- the second polarization plate is arranged downstream of the reflection-type polarization plate.

10. The polarization optical system as recited in claim 9, further comprising an optical compensation plate, between the reflection-type polarization plate and the reflection-type liquid-crystal valve, for compensating a polarized-light's phase difference generated by the reflection-type liquid-crystal light valve.

11. A projection-type liquid-crystal display device comprising:
- a liquid-crystal light valve;
- a light source for emitting a light beam to irradiate the liquid-crystal light valve;
- an illumination optical system for irradiating the liquid-crystal light valve with the light beam emitted from the light source;
- a projection optical system for projecting onto a screen imaging light exiting from the liquid-crystal light valve; and
- a polarization optical system comprising:
    - a first polarization plate, arranged at the light incident side of a liquid-crystal light valve, for transmitting first linearly-polarized light included in light incident on the liquid-crystal light valve from an illumination optical system; and
    - a second polarization plate, arranged at the light exit side of the liquid-crystal light valve, for transmitting second linearly-polarized light, different from the first linearly-polarized light, included in imaging light emitted from the liquid-crystal light valve to a projection optical system, the second polarization plate having a face concave toward the light exit side of the liquid-crystal light valve,
    - wherein the concave face of the second polarization plate is a spherical face whose radius is an optical distance from the liquid-crystal light valve to the second polarization plate.

* * * * *